United States Patent
Zayas et al.

(12)

(10) Patent No.: US 6,742,035 B1
(45) Date of Patent: May 25, 2004

(54) DIRECTORY-BASED VOLUME LOCATION SERVICE FOR A DISTRIBUTED FILE SYSTEM

(75) Inventors: Edward R. Zayas, Salem, UT (US); Stephen G. Toner, Sundance, UT (US); Delos C. Jensen, Orem, UT (US); Stephen R. Carter, Provo, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/515,087

(22) Filed: Feb. 28, 2000

(51) Int. Cl.⁷ .................. G06F 15/173; G06F 17/30
(52) U.S. Cl. ..................... 709/226; 707/10; 707/4
(58) Field of Search ................... 707/10, 501.1, 707/3, 100, 4, 200; 709/224, 225, 226, 203, 219

(56) References Cited

U.S. PATENT DOCUMENTS

| | | |
|---|---|---|
| 4,611,298 A | 9/1986 | Schuldt |
| 5,012,405 A * | 4/1991 | Nishikado et al. ............. 707/8 |
| 5,675,787 A | 10/1997 | Miller et al. |
| 5,699,518 A | 12/1997 | Held et al. |

(List continued on next page.)

FOREIGN PATENT DOCUMENTS

WO    WO 95/01605    1/1995

OTHER PUBLICATIONS

Schnatz, R.; Woznick, B., Bono, G., Burke, E., Geyer, S., Hoffman, M., MacGregor, W., Sands, R., Thomas, R. and Toner, S., *Cronus, A Distributed Operating System: Interim Technical Report No. 2*, Bolt Beranek and Newman, Inc., Report No. 5261, Feb. 1983 pp. 12–17, 31–33.

Zayas, Edward R., *AFS–3 Programmer's Reference:BOS Server Interface*, Chapter 1, pp. 1–2, 65–70, Version 1.0, FS–00–D161, Transarc Corporation, Aug. 28, 1991.

(List continued on next page.)

Primary Examiner—David Wiley
Assistant Examiner—Michael Delgado
(74) Attorney, Agent, or Firm—Marger Johnson & McCollom PC

(57) ABSTRACT

In a hierarchically organized distributed file system, resources belong to the containers in which they are located. These resources do not have to be co-located with the, containers in which they are stored, but can be distributed over the file system. To locate a desired resource, the unique name of the resource is determined. Moving upward through the containers in the hierarchically organized distributed file system, the lowest container with a location service is determined. The location service is queried for known instances of the resource. Any instance of the resource returned from the location service can then be utilized. Semantic contexts can also be applied to the network to control access or usage of both the location services and resource instances. The use of semantic contexts allows for improvements in network usage, security, resource allocation, and the like.

22 Claims, 12 Drawing Sheets

U.S. PATENT DOCUMENTS

| | | | | |
|---|---|---|---|---|
| 5,729,730 A | * | 3/1998 | Wlaschin et al. | 707/3 |
| 5,761,678 A | * | 6/1998 | Bendert et al. | 707/204 |
| 5,889,951 A | * | 3/1999 | Lombardi | 709/219 |
| 5,893,087 A | | 4/1999 | Wlaschin et al. | |
| 6,023,706 A | * | 2/2000 | Schmuck et al. | 707/200 |
| 6,029,165 A | * | 2/2000 | Gable | 707/3 |
| 6,151,604 A | | 11/2000 | Wlaschin et al. | |
| 6,199,099 B1 | * | 3/2001 | Gershman et al. | 709/203 |
| 6,226,635 B1 | * | 5/2001 | Katariya | 707/4 |
| 6,266,682 B1 | * | 7/2001 | LaMarca et al. | 707/501.1 |
| 6,311,194 B1 | | 10/2001 | Sheth et al. | 707/505 |
| 6,523,166 B1 | * | 2/2003 | Mishra et al. | 717/174 |

OTHER PUBLICATIONS

Zayas, Edward R., *AFS–3 Programmer's Reference: Volume Server/Volume Location Server, Interface*, Chapter 1, pp. 1–2, Chapter 2, pp. 4–5, 14, 26, Version 1.0, FS–00–D165, Transarc Corporation, Aug. 29, 1991.

Zayas, Edward R., *AFS–3 Programmer's Reference: Architectural Overview*, pp. 17–18, Version 1.0, FS–00–D160, Transarc Corporation, Sep. 2, 1991.

Microsoft Professional Developer's Conference 97 slides, San Diego, CA.

* cited by examiner

DIRECTORY-BASED VOLUME LOCATION SERVICE FOR A DISTRIBUTED FILE SYSTEM

FIELD OF THE INVENTION

This invention pertains to distributed file systems, and more particularly to locating instances of a selected volume over the distributed file system.

BACKGROUND OF THE INVENTION

In conventional file systems, a client on a workstation can access a specific named volume on a specific named server. As the volume name is human-readable, there could be other volumes in the network with the same name on different servers, but these bear no relation to any other volumes with the same name. Products exist to replicate data between volumes on different servers, but the client is still required to specify which instance of a replicated volume it wants to access.

A Distributed File System (DFS) eliminates the strong tie between a file and the server on which it resides. With DFS, volumes still exist, but they can move between servers or have multiple instances that exist on different servers. The client specifies only the DFS volume name or its Global Unique Identifier (GUID) when accessing files. The advantages of DFS can be generalized to any kind of resource that can be distributed (e.g., printers, scanners, etc.). But without some mechanism to assist the client in finding to which physical server or servers the resource is attached, DFS is of limited value.

There have been several prior attempts to implement distributed file systems. The National Software Works (NSW), implemented by the Advanced Research Projects Agency (ARPA), included a single global volume distributed across multiple physical machines for file storage, a solution that did not scale well. Cronus, a distributed operating system research project undertaken by Bolt Beranek and Newman (BBN) under contract to the Rome Air Development Center (RADC), used a (statistically) unique name for the object as a clue to its location. But if the object was not known by that host (perhaps because it had been moved), the object would have to be located by broadcasting a message on the network. This approach did not scale well, and broadcasting messages can be difficult in any event. The AFS-3 file system by Transarc Corporation included a single back-end database implementation with a well-known name for the volume location servers. This approach is difficult to generalize, and has a single point of failure (the database). Microsoft used reparse points, which contain the full list of hosts where the volume instances can be found. But if a volume moves or a new instance is added, the reparse points must be modified, which is a difficult task.

Accordingly, a need remains for a mechanism that allows a client to locate instances of a resource given the resource's naming information that is easily scalable, includes redundancies for continued performance, and is easily updated as volumes are added to or removed from the DFS.

SUMMARY OF THE INVENTION

To locate an instance of a resource, the management context for the resource name is consulted. The management context identifies a set of location services that can locate instances of the resource. Each location service knows where all resource instances within its management context are located. One of the location services is then queried for the location of resource instances. The location service returns the location of all known instances of any given resource under the location service's control. One resource instance is selected. The selected resource instance can be contacted and utilized.

If either the location service or the selected resource instance cannot be contacted, alternative location services or resource instances can be used. As each location service knows of all instances of resources in the location service's scope, and the data and metadata of each resource instance are substitutable for any other resource instance, the techniques for selecting the location service or resource instance from the given sets are not significant.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1A:
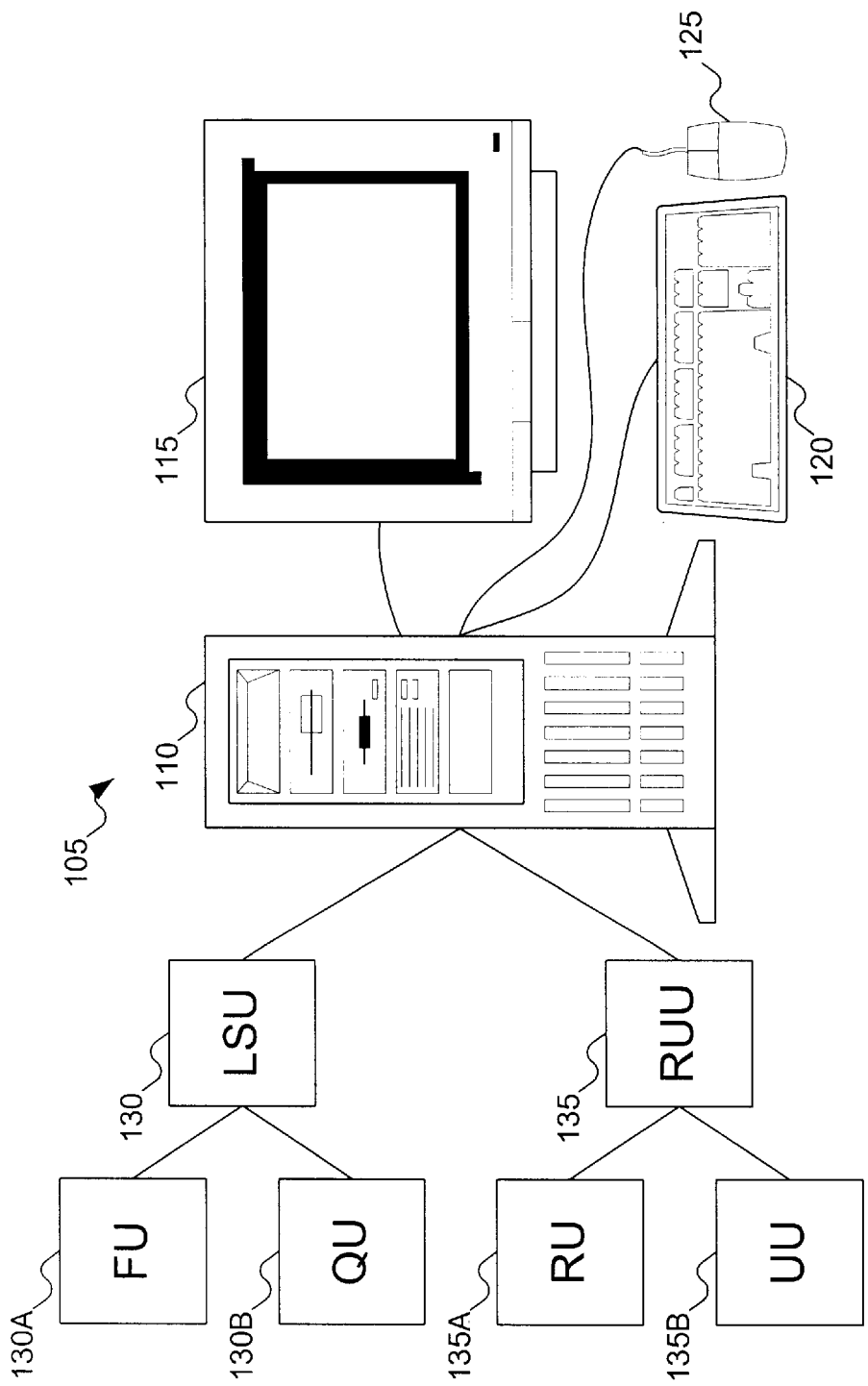
FIG. 1A shows a computer system on which the invention can operate.

FIG. 1A shows a computer system 105 on which the volume location service of the invention can operate. Computer system 105 conventionally includes a computer 110, a monitor 115, a keyboard 120, and a mouse 125. Optional equipment not shown in FIG. 1A can include a printer and other input/output devices. Also not shown in FIG. 1A are the internal components of computer system 105: e.g., a central processing unit, memory, file system, etc.

Computer system 105 further includes a location service unit 130 and a resource utilization unit 135. Location service unit 130 is responsible for finding a volume location service and querying that service for an instance of the resource. (Although the description of the preferred embodiment is directed toward locating volumes on a Distributed File System (DFS), a person skilled in the art will recognize that the method can be generalized to locating an instance of any type of resource that can be distributed over the network.) To that end, location service unit 130 includes two sub-units: finding sub-unit 130A and querying sub-unit 130B. Resource utilization unit 135 is responsible for receiving a pointer to a resource instance and utilizing that resource instance. To that end, resource utilization unit 135 includes two sub-units: receiving sub-unit 135A and utilization sub-unit 135B. In the preferred embodiment, location service unit 130 and resource utilization unit 135 and their sub-units are implemented in software.

Figure 1B:
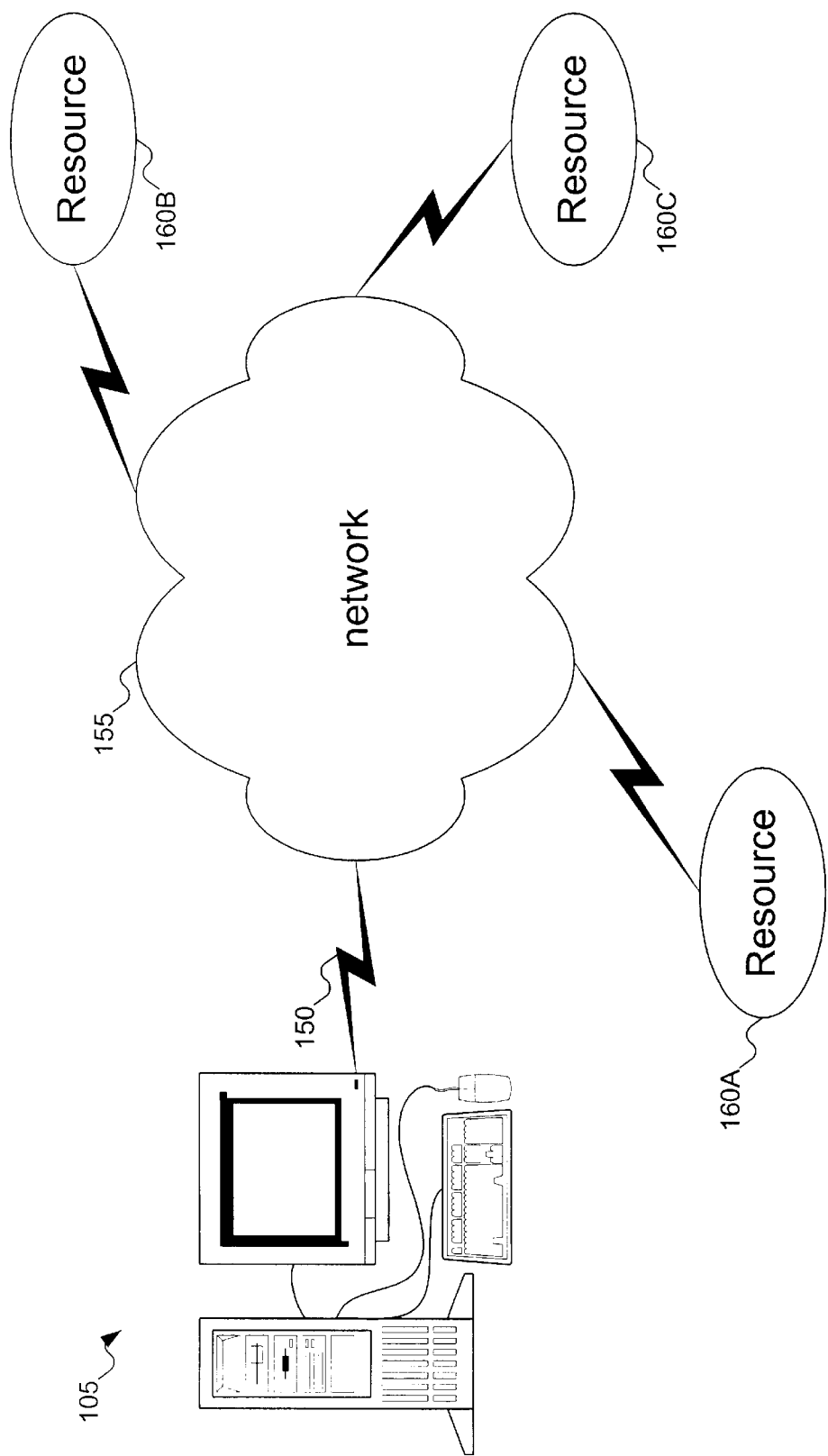
FIG. 1B shows the computer system of FIG. 1A connected to a network.

FIG. 1B shows computer system 105 connected over a network connection 150 to a network 155. By using network 155, resources, e.g., computers and their associated software facilities, peripherals, and data files, such as resources 160A, 160B, and 160C, are accessible. The DFS allows volumes that are physically located on remote servers to be viewed as part of the local hierarchy. A special type of link object called a junction allows references to the roots of other volumes, and ties the many volumes into a single hierarchy. Thus, rather than thinking about volumes and their physical connections to networks, it is preferable to view volumes as containers for their contents.

Figure 2:
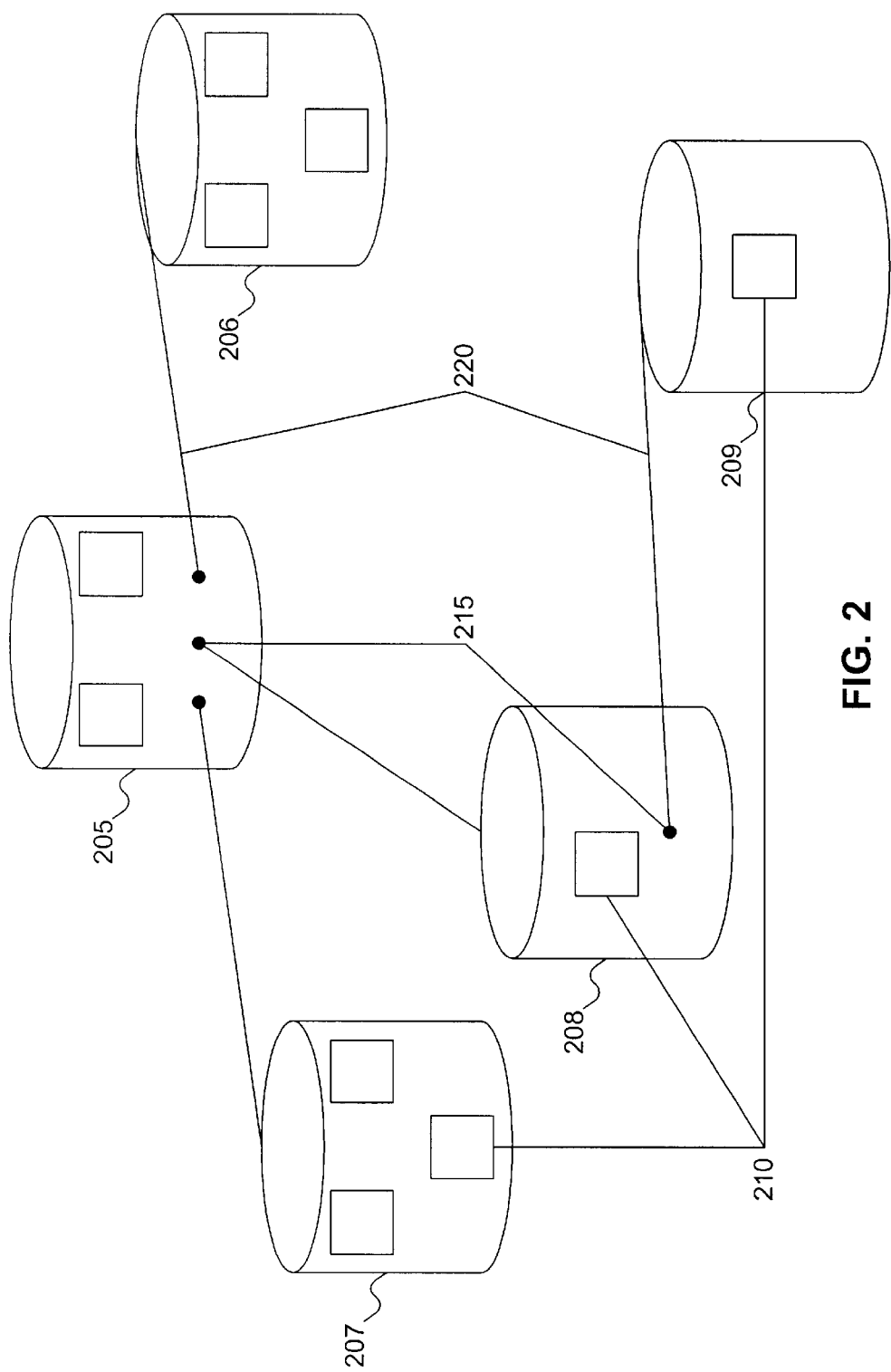
FIG. 2 shows a number of volumes in the Distributed File System for the network of FIG. 1B according to the preferred embodiment.

FIG. 2 shows a number of volumes in a DFS. Because volumes 205–209 can be located anywhere on the DFS, no particular organization is imposed on the volumes. Each volume can include objects 210. Objects 210 can include references to more volumes, file objects, or other resources. One particular type of object 210 is a junction 215. Junctions 215 organize the volumes into a hierarchy, represented by lines 220.

Figure 3:
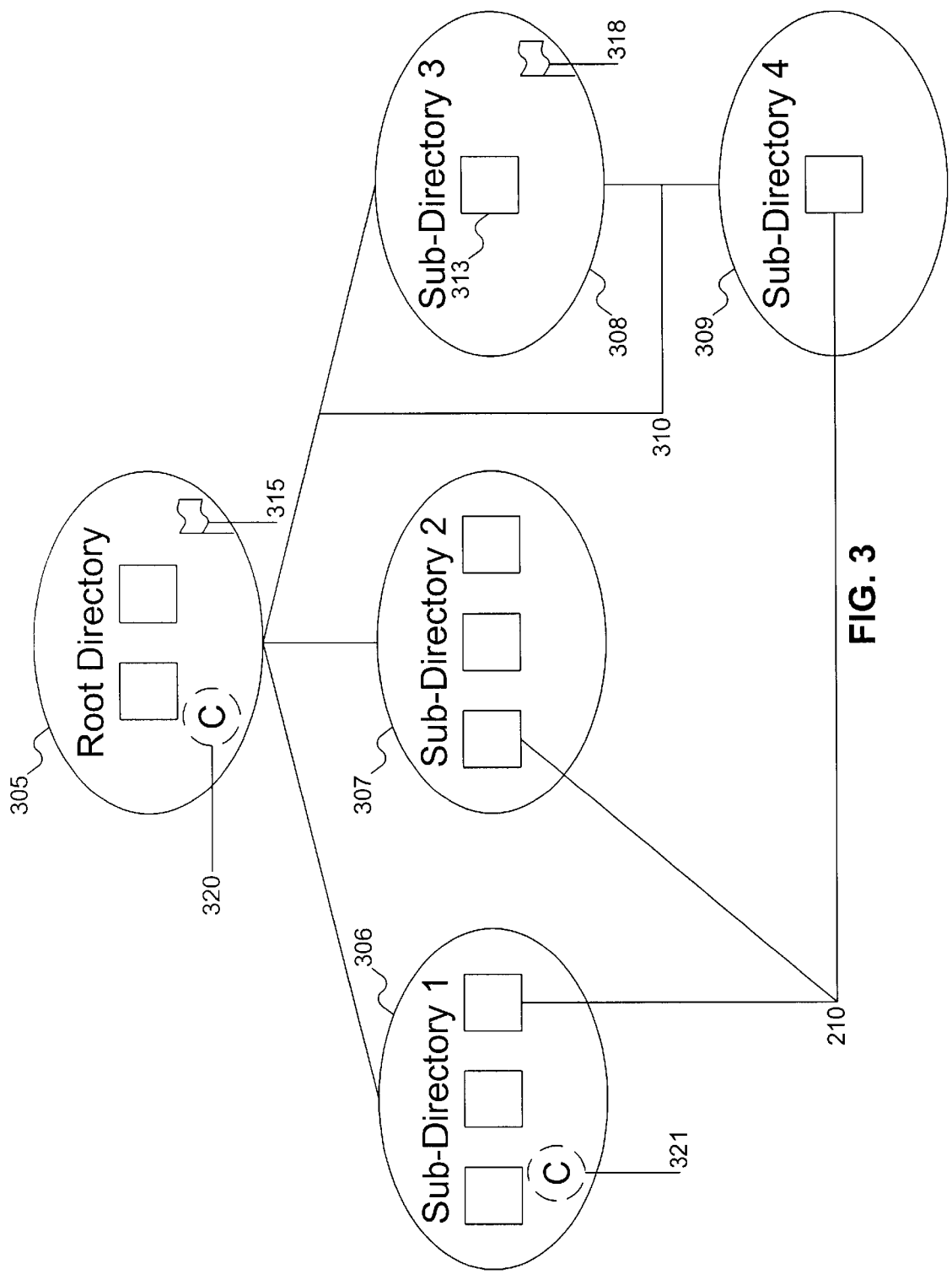
FIG. 3 is a tree structure showing the logical structure for the volumes of the Distributed File System in FIG. 2 according to the preferred embodiment.

FIG. 3 shows another way of viewing the logical structure of the volumes of FIG. 2. In FIG. 3, the logical structure is shown as a tree. The tree includes nodes 305–309, corresponding to volumes 205–209. Junctions are represented in FIG. 3 by lines 310 that hierarchically organize the nodes 305–309 into a tree. Each node has a Globally Unique Identifier (GUID) for a name. The assignment of GUIDs to nodes is known in the art. GUIDs are generally stored as 128-bit strings, and are statistically unique. Because GUIDs are generally not very meaningful to humans, a person skilled in the art will recognize that each node can have a second name. This second name will generally be human-readable, but is not guaranteed to be statistically unique. The human-readable name can also change over time without affecting the volume location service, which relies on the GUID of the volume being sought. Each node 305–309 can also include objects 210.

At the top of the tree is a root directory 305. Root directory 305 includes all other nodes, either directly or indirectly. There can only be one root directory. Root directory 305 is the outermost container in the network.

Figure 4:
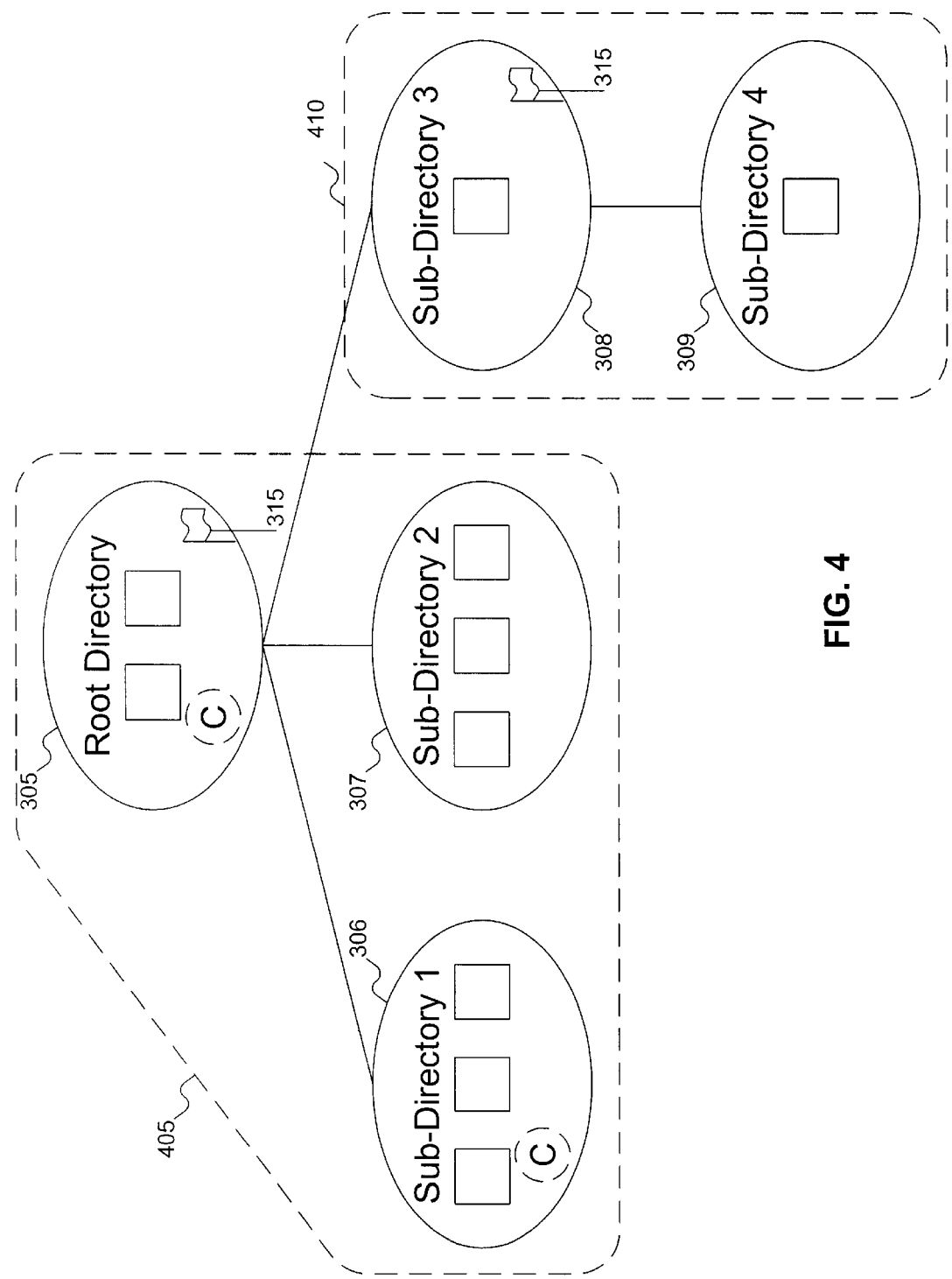
FIG. 4 shows how the tree of FIG. 3 is sub-divided into sets of nodes supported by different volume location services.
Figure 6:
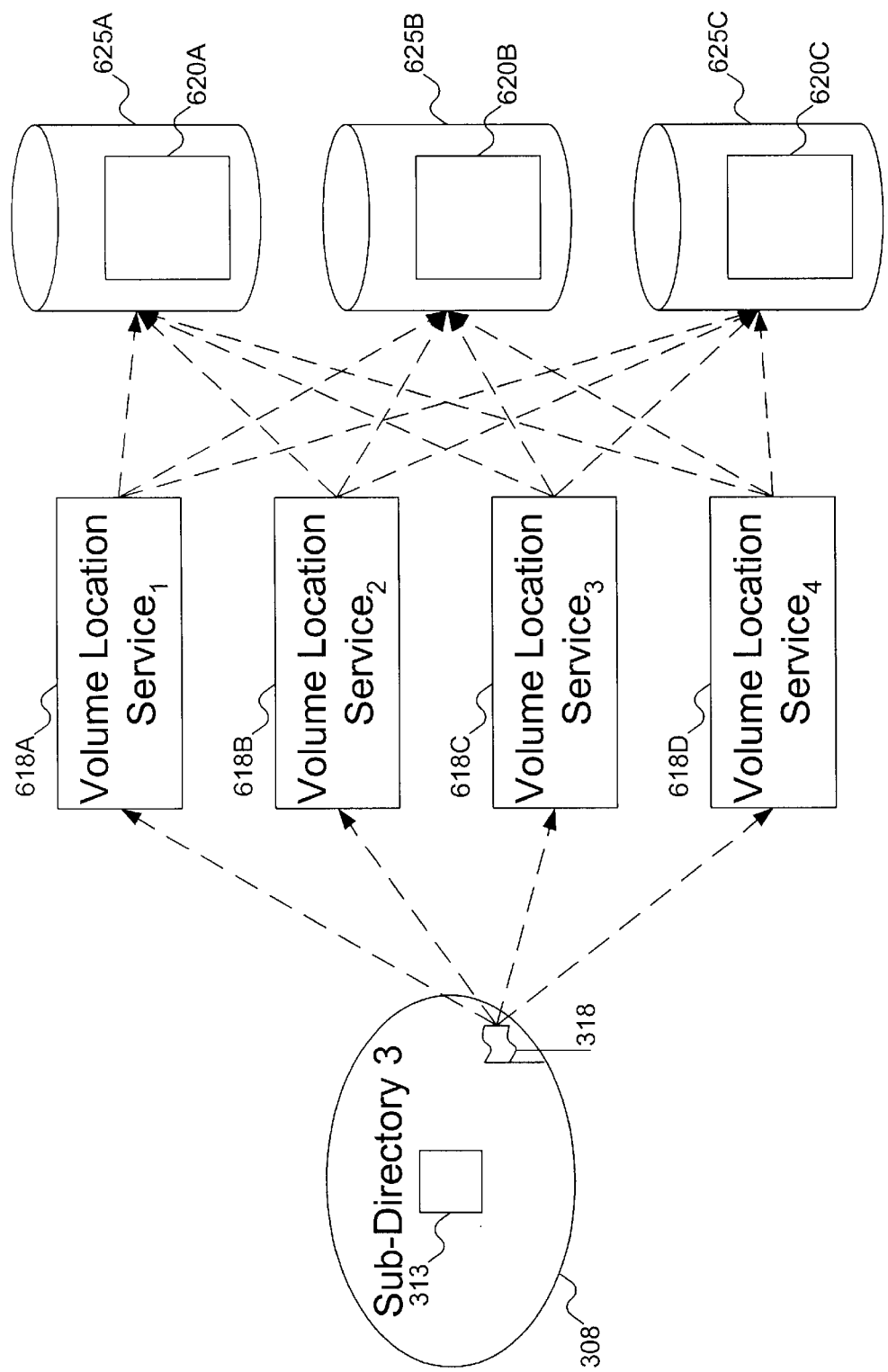
FIG. 6 shows how the volume location service can be used to locate an instance of the desired resource over the network of FIG. 1B.

Each node 305–309 can include an attribute tab, such as attribute tabs 315 and 318. (Attribute tabs 315 and 318 were not shown in FIG. 2 for simplicity.) Attribute tabs 315 and 318 store properties for the nodes to which they are attached (in FIG. 3, nodes 305 and 308 respectively). Attribute tabs 315 and 318 can be stored as data fields in the directory system, although a person skilled in the art will recognize that other techniques can be used to store attribute tabs. Each attribute tab 315, 318 gives the location of the volume location services for the node in the tree to which the attribute tab 315, 318 is attached, as shown in FIG. 6. The volume location services identified by attribute tab 315, 318 also service every node in the tree below the node in the tree to which the attribute tab 315, 318 is attached and that is not covered by another attribute tab. For example, because node 308 includes attribute tab 318, the volume location services identified by attribute tab 318 service nodes 308 and 309. Attribute tab 315, therefore, does not service nodes 308 or 309. FIG. 4 shows graphically which nodes in the tree are serviced by which attribute tabs. Attribute tab 315 services nodes 305, 306, and 307 (shown by grouping 405); attribute tab 318 services nodes 308 and 309 (shown by grouping 410). Because each node in the tree must be serviced by a volume location service, root node 305 must include attribute tab 315; an attribute tab is optional for all other nodes in the tree. How attribute tabs are used to locate a resource instance is discussed below with reference to FIG. 6.

The hierarchy of the DFS establishes a management context for each object in the tree. The "management context" is the set of nesting containers containing the object of interest. So, for example, the management context for object 313 includes "Root Directory/Sub-Directory 3." In general, clients will know the human-readable name but not the GUID. Using the management context, objects with the same human-readable name but different management contexts can be distinguished, and the correct GUID obtained from the DFS for use with the volume location service.

Figure 5:
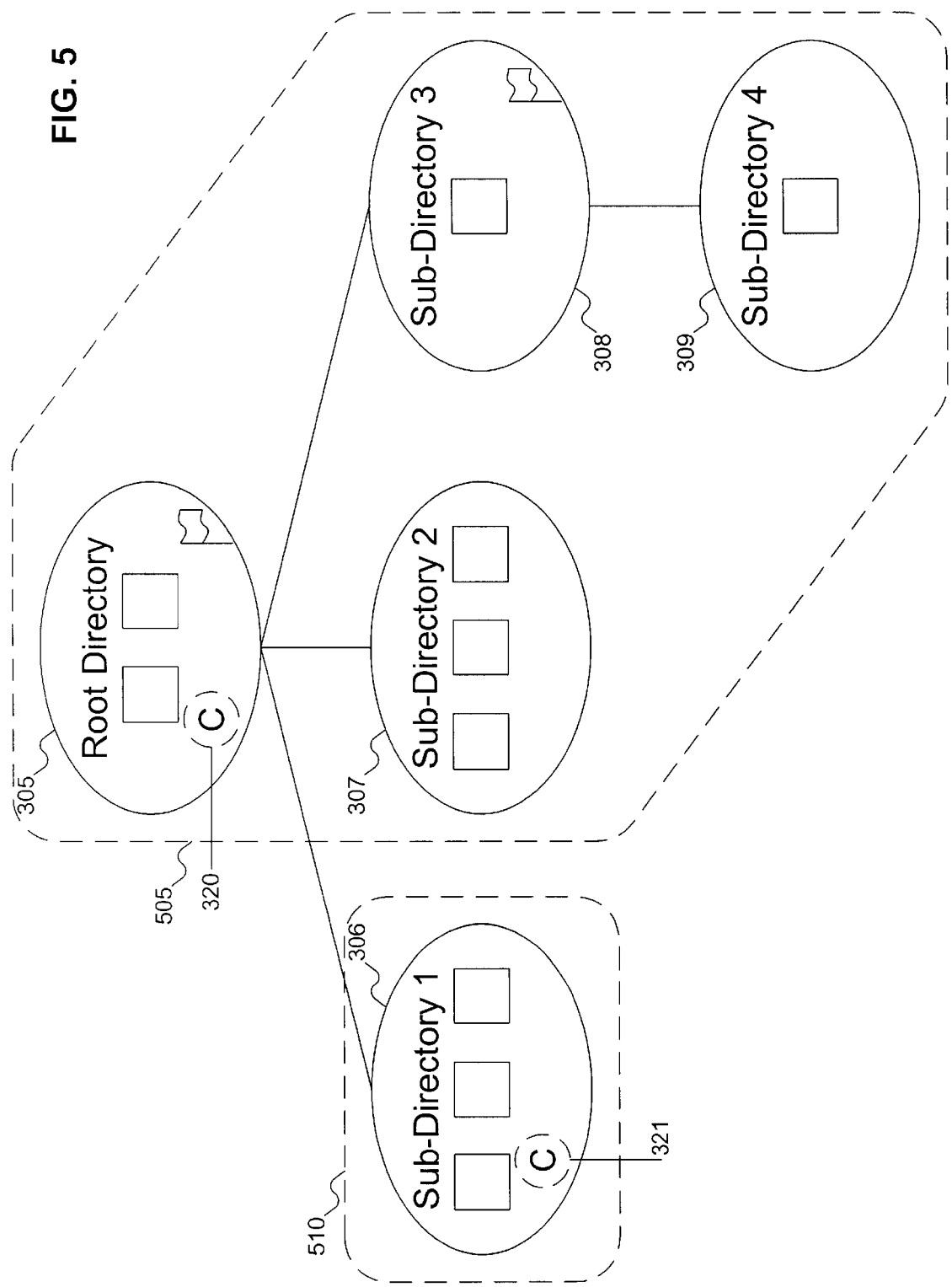
FIG. 5 shows how the tree of FIG. 3 is sub-divided into set of nodes for which different semantic contexts are to be applied to the network of FIG. 1B.

Returning to FIG. 3, each node in the tree can also optionally include a semantic context, such as semantic contexts 320 and 321. (Semantic contexts 320 and 321 were not shown in FIG. 2 for simplicity.) Semantic contexts 320 and 321 for the node specifies how the network is to be viewed in using the network. (The term "semantic context" in this connection is not to be confused with the term "management context," discussed above.) Semantic contexts 320 and 321 can be stored as data fields in the file system, although a person skilled in the art will recognize that other techniques can be used to store semantic contexts. As with attribute tabs, the semantic context to be applied to the network is determined by locating the lowest level container containing the desired object with an attached semantic context. For example, node 305 has attached semantic context 320, and node 306 has attached semantic context 321. FIG. 5 shows graphically which nodes in the tree are serviced by which semantic contexts. Semantic context 320 services nodes 305, 307, 308, and 309 (shown by grouping 505); semantic context 321 services node 306 (shown by grouping 510). Semantic context will be discussed further below with reference to FIGS. 8A–8B, 9, and 10.

A person skilled in the art will recognize that, although the above discussion talks about locating volumes, volume location services can locate other types of resources. For example, printers are a type of resource that can be distributed across a network. Network administrators can add and remove printers at any time without informing users of the change in available printers. When a printout is needed, the first step is determining the best printer for the job. Volume location services can locate printer resources just as easily as they can locate volumes. Of course, resources such as printers may not be identical. For example, printing black-and-white text on color printers is generally more expensive than printing black-and-white text on a black-and-white printer, but it is possible. Thus, the volume location service for physical resources locates the resources themselves, not instances of the resource, as with electronic resources (where every copy is absolutely identical).

FIG. 6 shows how a client can use the volume location service to locate an instance of the desired resource. In FIG. 6, the desired resource is the object 313. Because object 313 is contained in node 308 and node 308 has an attached attribute tab 318, the volume location service pointed to by attribute tab 318 is used. Attribute tab 318 points to volume location services 618A–618D. In FIG. 6 there are four copies of the volume location services; however, a person skilled in the art will recognize that there can be more or fewer volume location services. Assume that the client uses volume location service 2 (618B). The client provides volume location service 2 (618B) with the GUID of object 313. As discussed above, the GUID can be obtained from the DFS if the management context is known. Volume location service 2 (618B) then accesses a distributed database to determine where instances of the desired object are located. In FIG. 6, volume location service 2 (618B) would inform the client that instances 620A–C of the desired object can be found in containers 625A–C. The client can then select which instance of the desired object it wishes to access. In FIG. 6 there are three instances of the resource; however, a person skilled in the art will recognize that there can be more or fewer resource instances.

Figure 7:
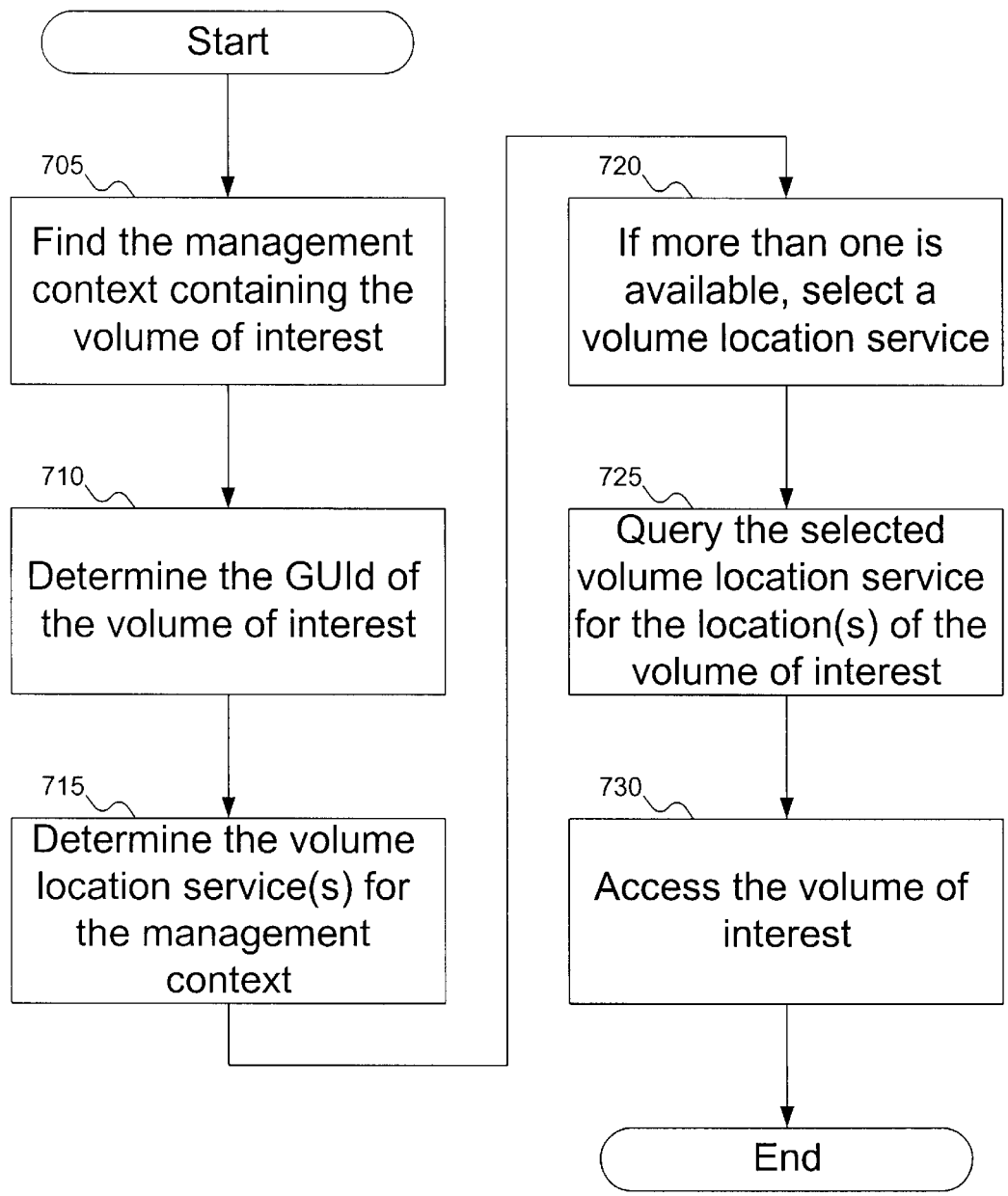
FIG. 7 is a flowchart showing how to use the volume location service to locate a volume according to the preferred embodiment.

FIG. 7 shows a flowchart of the steps a client takes to use the volume location service. At step 705, the management context containing the volume of interest is determined. Then, at step 710, the GUID of the volume of interest is determined. As discussed above, given the volume's human-readable name and its management context, the GUID is easily determined. A person skilled in the art will also recognize that the steps of determining the management context for a volume of interest and the GUID of the volume of interest are completely separate. Therefore, the order of the steps can be interchanged. At step 715, the volume location service(s) for the management context are determined. At step 720, if more than one volume location service is available, one of the available volume location services is selected. At step 725, the selected volume location service is queried to locate an instance of the desired volume. A person skilled in the art will recognize that, if the selected volume location service cannot be accessed, steps 720 and 725 can be repeated to select an alternate volume location service. Finally, at step 730, the located instance of the desired volume is accessed. If more than one instance of the desired volume is located by the volume location service, the client can access any one of the instances.

At this point, a person skilled in the art will recognize that, by taking advantage of the volume location service, administration of the resource instances can be done entirely behind the scenes, without the assistance of a system administrator. As resource instances are added or removed, the DFS can use the volume name and management context to automatically inform all volume location services of the changes. The system administrator does not need to deal with the particulars of updating the volume location service. In the preferred embodiment, this is even further generalized: the DFS only needs to inform one volume location service of the change. The informed volume location service then passes the update to the other volume location services within the management context for the volume.

Figure 8A:
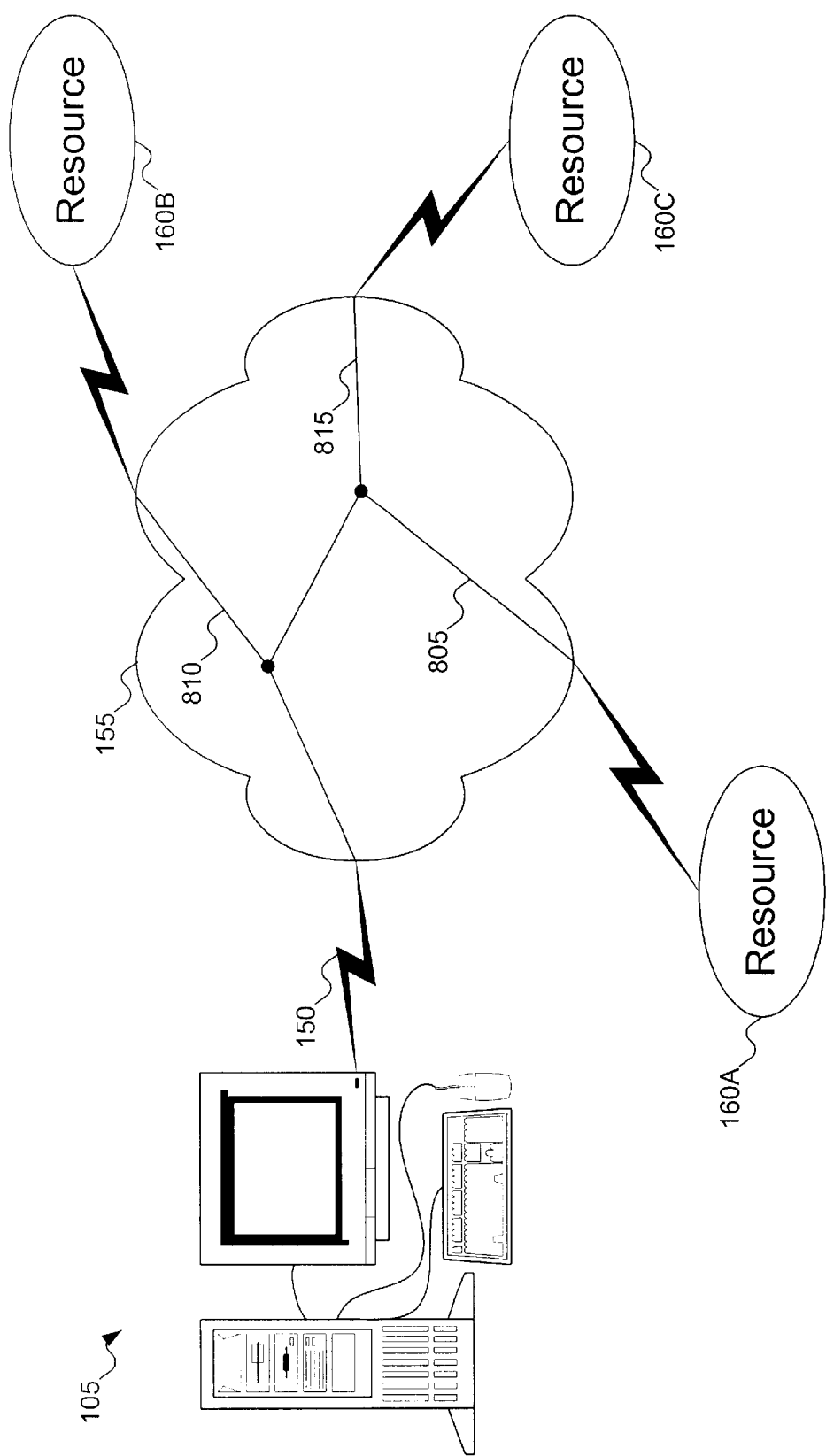
FIGS. 8A–8B show the effect of applying a semantic context to the network of FIG. 1B.
Figure 8B:
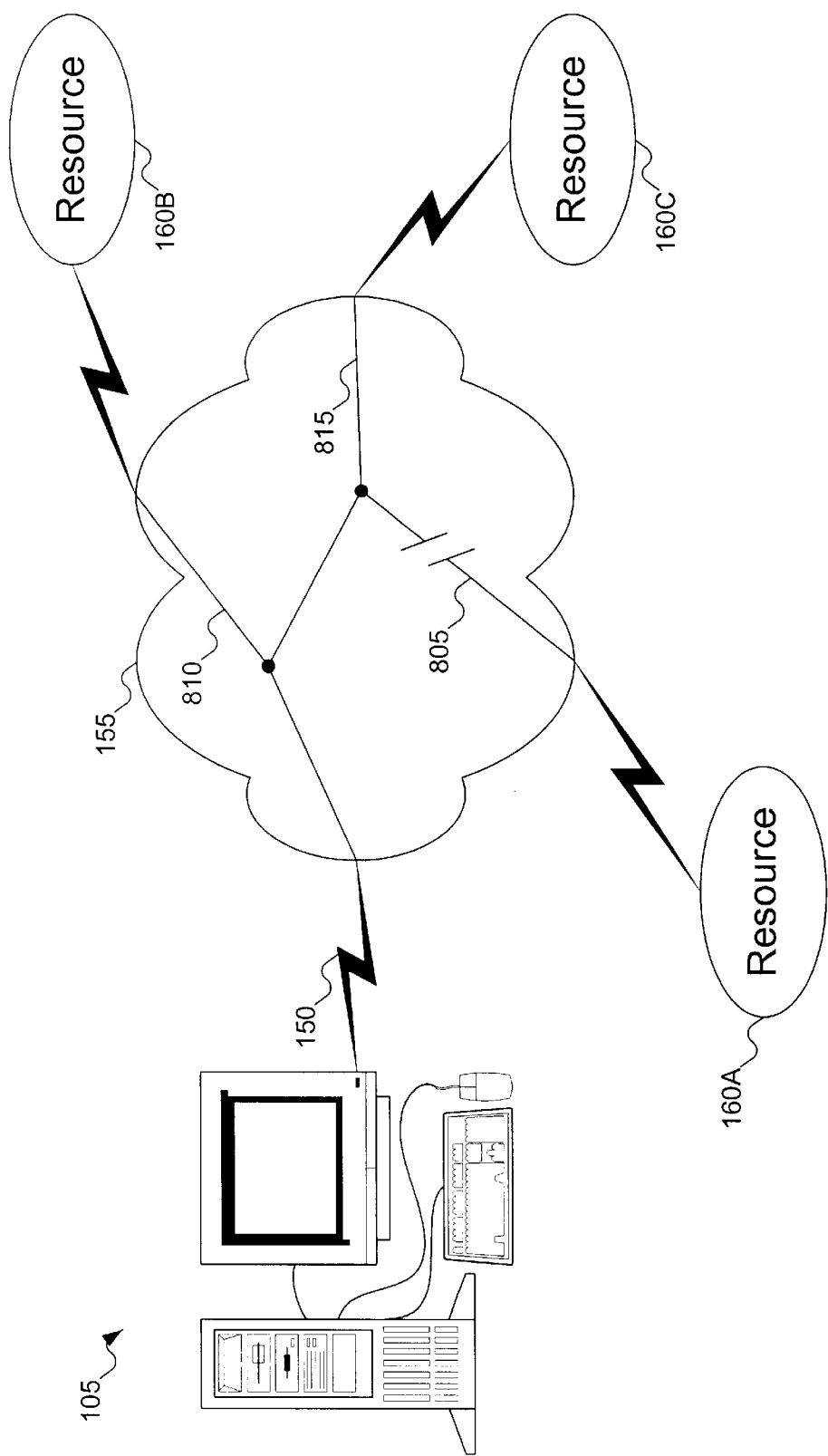

FIGS. 8A–8B show the effect of applying a semantic context to the network. As a reminder, a semantic context determines how the network should be viewed while locating a resource instance. In FIG. 8A, the volume location service has identified three instances 160A–C of the resource desired by the client. Instances 160A–C and computer 105 are connected by network 155, which includes, among other links, lines 805, 810, and 815. At this point, before a semantic context is applied, based solely on the number of hops required to reach the resource instance, resource instance 160B is the closest resource instance to computer 105. For example, if the resource the client desires is a printer, resource 160B may be the printer physically closest to the client. (As discussed above, with physical resources, the volume location service locates the resource itself, and not an instance of the resource.)

In FIG. 8B, a semantic context has been applied to network 155. The semantic context specifies a specific policy for resource instance access and usage. For example, continuing with the example of the desired resource being a printer, the semantic context has specified that resource 160A is not available to the client. Perhaps the printer is reserved for certain users, or is in a secure location inaccessible to the client. The specific reason is not important. Applying the semantic context effectively "cuts" link 805 (e.g., by making the cost of using link 805 infinite), and this denies the client access to resource 160A.

The semantic context can also change the relative priority of the resource instances. Continuing with the example of the desired resource being a printer, resource 160B may be a color printer, whereas resource 160C is a black-and-white printer. If the client only needs to print text, the semantic context can increase the cost of selecting resource 160B, "encouraging" the use of resource 160C.

Although the discussion of FIGS. 8A–8B focused on applying a semantic context to resource instance selection, semantic contexts can also be applied in selecting volume location services. Thus, in locating a resource instance, two semantic contexts may be applied: one to select the volume location service, and one to select the resource instance.

As discussed above with reference to FIG. 3, semantic contexts can be attached to nodes in the tree. This allows for semantic contexts to be inherited and automatically applied. Alternatively, semantic contexts can be applied specifically to individual network uses (for example, by a system administrator).

Figure 9:
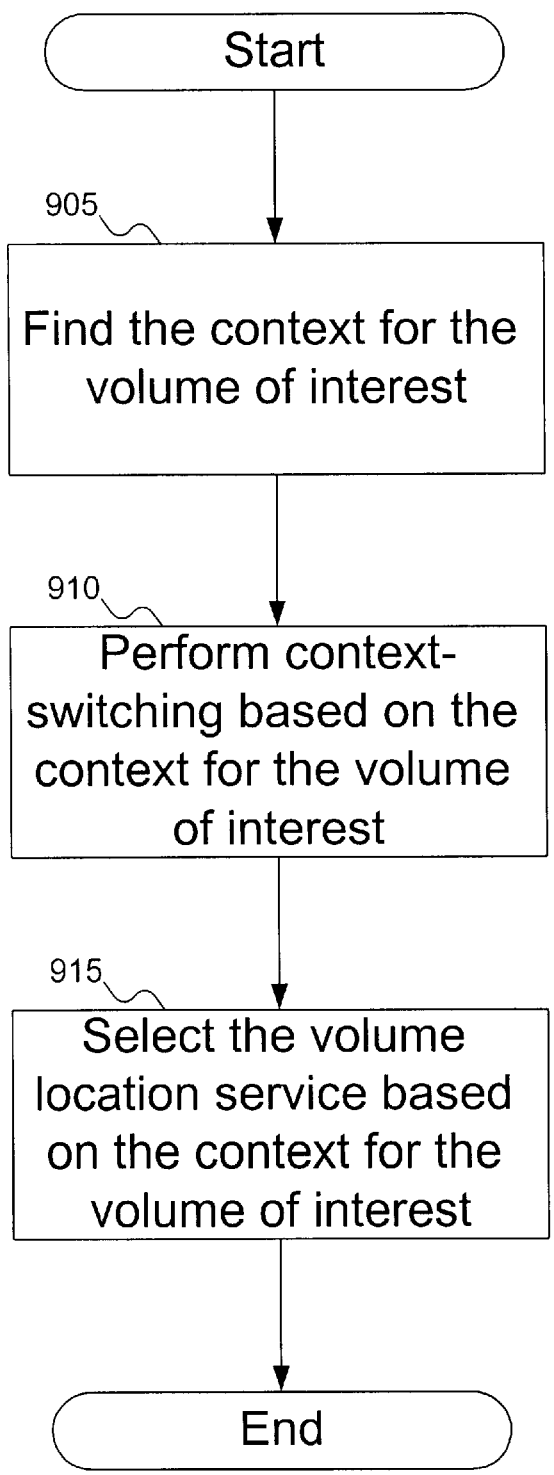
FIG. 9 is a flowchart showing how to apply a semantic context in selecting a volume location service according to the preferred embodiment.

FIG. 9 shows the steps taken to apply a semantic context in selecting a volume location service. At step 905 the semantic context for the volume of interest is located. At step 910, the network is context-switched based on the located semantic context. Finally, at step 915, a volume location service is selected based on the semantic context applied to the network.

Figure 10:
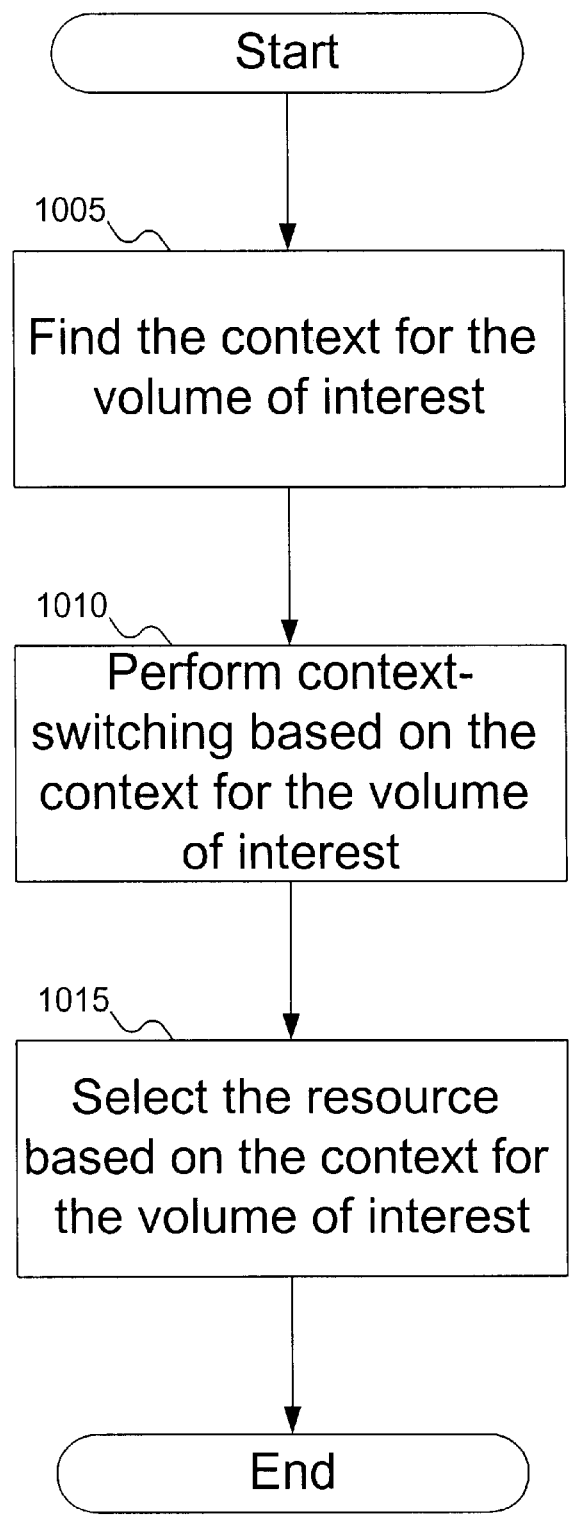
FIG. 10 is a flowchart showing how to apply a semantic context in selecting a resource instance according to the preferred embodiment.

FIG. 10 shows the steps taken to apply a semantic context in selecting a resource instance. At step 1005, the semantic context for the resource name is located. At step 1010, the network is context-switched based on the located semantic context. Finally, at step 1015, a resource instance is selected based on the semantic context applied to the network.

The volume location service provides advantages over alternative solutions to distributed file systems. The National Software Works (NSW) project was an early distributed operating system research project initiated in 1974 by ARPA. NSW included a Resource Catalog that implemented a global symbolic name space for objects, including files. Files and other objects could be located on various machines in the ARPANET, running various operating systems. File lookup was handled by a component called the Works Manager. The Works Manager contained a copy of the entire Resource Catalog. A component that wished to access a file sent a message to the Works Manager which then looked up the file and returned a list of descriptors for all the available physical images of the file. The requesting component would then choose an available image and copy it to its local file system by communicating with a File Package component on the machine that stored the image. So in effect, NSW provided one single global volume distributed across multiple physical machines for file storage. The centralized management nature of the Works manager (there were two Works managers per NSW system—basically a main and a backup) does not scale well, and leaves the system susceptible to communication outages—if the link to the Works Manager is down, the system becomes unusable. In contrast, the volume location service is easily scalable, as each volume location service is only required to support a portion of the DFS. Further, introducing redundancy into the volume location service is a simple procedure.

Cronus was a distributed operation system research project undertaken by Bolt Beranek and Newman (BBN) in the early 1980s under contract to the Rome Air Development Center (RADC). Cronus was an object-oriented system, and files were one type of object that could exist in the system. There was a directory, but it contained only file objects. Objects were identified by a 96-bit unique identifier. 16 bits of this identifier contained a host address, which was used as a hint as to the object's location. All object access occurred though a component known as the Operation Switch. When a program performed an operation on an object, the Operation Switch on that machine would attempt to access the object on the host identified in the unique identifier by contacting the specified machine's operation switch. If the object was not known by that host (perhaps because it had been moved), the Operation Switch would broadcast a Locate message on the network. This message would be received by all other Operation Switches and they would determine whether the specified object was hosted on their machine and if so, send a response to the originating Operation Switch. This solution does not scale well and does not work well in a WAN environment, where it is usually difficult to send broadcast messages. In contrast, the volume location service does not require any broadcast messages to be sent: clients communicate directly with the volume location service and the desired resource instance. Further, as discussed above, the volume location service is easily scalable.

The AFS-3 file system from Transarc Corporation had a volume location service that is in many ways similar to the volume location service described herein. However, there are significant differences. AFS-3 provided a single back-end database implementation. It did not have a directory service available to tie the service into. AFS-3 used a configuration file with a well-known name to find volume location servers. In contrast, the volume location service described herein is tied into an available directory service, without relying on a single back-end database. Further, the names of the servers storing the volume location services are not fixed, generalizing the solution.

Microsoft Corporation describes its distributed file system as using something called reparse points, which are objects in the existing file system. These reparse points contain the full list of hosts where the volume instances can be found. Thus, a distributed file system volume is "mounted" in an existing file system directory, and if a volume moves or a new instance is added, it will be necessary to modify the reparse point itself. In the general case, this would be a major undertaking, as there could be many instances of different reparse points scattered throughout the entire file system. Microsoft solves this problem by only allowing reparse points to exist at one point in the directory tree. The use of junctions is more general, as junctions can appear as directories anywhere in the file system and allow the physical location information to be updated in a single place for all volume references.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for using a first,location service to locate a resource, the method comprising:

finding a set of location services for a management context containing the resource, wherein the management context includes a set of nesting containers containing the resource and the set of location services includes at least the first location service, each location service in the set of location services capable of operating independently of the others;

querying the first location service for the locations of at least one instance of the resource using a human-readable name for the resource and the management context;

receiving a set of resource instances, wherein the set of resource instances includes at least a first resource instance, and each resource instance is a instantiation of the resource; and utilizing the first resource instance.

2. A method according to claim 1 wherein finding a set of location services includes:

organizing the computer system into containers to establish the management context;

finding a lowest container within the management context that contains the resource; and obtaining the set of location services from the lowest container.

3. A method according to claim 1 wherein querying the first location service includes querying a second location service for the location of the resource instances if the first location service does not respond to a query.

4. A method according to claim 1 wherein utilizing the first resource instance includes utilizing a second resource instance if the first resource instance does not respond to a request to utilize the first resource instance.

5. A method according to claim 1 further including informing each location service in the set of location services when a resource instance is added or removed from the computer system.

6. A method according to claim 1 wherein:

the method further comprises applying a semantic context to the set of resource instances received from the first location service; and utilizing the first resource instance includes selecting the first resource instance based on the semantic context applied to the set of resource instances.

7. A method according to claim 1 wherein:

the method further comprises applying a semantic context to the set of location services for the management context containing the resource; and querying the first location service includes selecting the first location service based on the semantic context applied to the set of location services.

8. A computer-readable medium containing a program implementing an algorithm for using a first location service to locate a resource, the program comprising:

finding software to find a set of location services for a management context containing the resource, wherein the management context includes a set of nesting containers containing the resource and the set of location services includes at least the first location service, each location service in the set of location services capable of operating independently of the others;

query software to query the first location service for the locations of at least one instance of the resource using a human-readable name for the resource within the management context;

reception software to receive a set of resource instances, wherein the set of resource instances includes at least a first resource instance, and each resource instance is an instantiation of the resource; and utilization software to utilize the first resource instance.

9. A computer-readable medium containing a program according to claim 8 wherein the finding software includes:

container-finding software to find a lowest container within the management context that contains the resource; and obtaining software to obtain the set of location services from the lowest container.

10. A computer-readable medium containing a program according to claim 8 wherein the query software includes second-query software to query a second location service for the locations of the resource instances if the first location service does not respond to a query.

11. A computer-readable medium containing a program according to claim 8 wherein the utilization software includes second-utilization software to utilize a second resource instance if the first resource instance does not respond to a request to utilize the first resource instance.

12. A computer-readable medium containing a program according to claim 8 further including informing software to inform each location service in the set of location services when an instance of the resource is added or removed from the computer system.

13. A computer-readable medium containing a program according to claim 8 wherein:

the program further comprises application software to apply a semantic context to the set of resources received from the first location service; and the utilizing software includes selection software to select the first resource instance based on the semantic context applied to the set of resources.

14. An apparatus for using a first location service to locate a resource, the apparatus comprising:

a network including at least two computers;

a distributed file system distributed across the network;

a resource accessible via the network;

a management context superimposed on a subset of the network, the management context including a set of nesting containers containing the resource;

a plurality of location services coupled to the network, the plurality of location services including at least the first location service, each location service in the plurality of location services capable of operating independently of the others;

query means for querying the first location service for the location of instances of the resource; and utilization means for utilizing a resource instance returned from the first location service in response to the query.

15. An apparatus according to claim 14 wherein the query means includes:

sending software to send a message to the first location service; and receiving software to receive a message from the first location service.

16. An apparatus according to claim 14 wherein the utilization means includes software to remotely access the resource instance returned from the first location service.

17. An apparatus according to claim 14 further:

comprising a first semantic context prioritizing the plurality of location services for query.

18. An apparatus according to claim 14 further comprising a second semantic context prioritizing a plurality of resource instances returned from the first location service.

19. An apparatus according to claim 14 wherein:

the resource includes at least one hardware peripheral connected to the network; and the first location service returns a location for each hardware peripheral resource.

20. An apparatus according to claim 14 wherein:

the resource includes at least one instance of a software element on the distributed file system; and the first location service returns a location for each instance of the software element resource.

21. A method according to claim 1, wherein:

the method further comprises determining a Global Unique Identifier (GUID) for the resource using the management context and the name for the resource; and querying the first location service includes querying the first location service for the locations of the resource instances using the GUID for the resource.

22. A computer-readable medium containing a program according to claim 8, wherein:

the program further includes determination software to determine a GUID for the resource using the management context and the name for the resource; and the querying software includes querying software to query the first location service for the locations of the resource instances using the GUID for the resource.

* * * * *

UNITED STATES PATENT AND TRADEMARK OFFICE
CERTIFICATE OF CORRECTION

PATENT NO. : 6,742,035 B1
DATED : May 25, 2004
INVENTOR(S) : Zayas et al.

It is certified that error appears in the above-identified patent and that said Letters Patent is hereby corrected as shown below:

Title page,
Item [57], ABSTRACT,
Line 3, "with the, containers" should read -- with the containers --.

Drawings,
Sheet 5, FIG. 4, at Sub-Directory 3, "315" should read -- 318 --.
Sheet 8, FIG. 7, "the GUId of" should read -- the GUID of --.

Column 6,
Line 5, "the-resource the" should read -- the resource the --.

Column 8,
Line 11, "a first,location" should read -- a first location --.

Column 10,
Line 21, "14 further: comprising" should read -- 14 further comprising --.

Signed and Sealed this

Fourth Day of January, 2005

JON W. DUDAS
*Director of the United States Patent and Trademark Office*